United States Patent Office 3,459,752
Patented Aug. 5, 1969

3,459,752
NOVEL 2 - AZOALKYL - 7 - CHLORO - 1,2,3,4-
TETRAHYDRO - 4 - OXO - 6 - QUINAZOLINE-
SULFONAMIDES
Robert Fitz Randolph Church, Riverside, Conn., and Martin Joseph Weiss, Oradell, N.J., assignors to American Cyanamid Company, Stamford, Conn., a corporation of Maine
No Drawing. Filed Dec. 30, 1966, Ser. No. 605,960
Int. Cl. C07d 51/48, 57/00
U.S. Cl. 260—256.5         2 Claims

ABSTRACT OF THE DISCLOSURE

The preparation of 2-azoalkyl-7-chloro-1,2,3,4-tetrahydro-4-oxo-6-quinazolinesulfonamides by reacting 2-amino-4-chloro-5-sulfamoylbenzamide with an azodiloweralkoxyalkane, azoketoalkane or azoloweralkylenedioxy alkane, is described. These compounds are useful as diuretics.

This invention relates to new diazirine compounds. More particularly, the invention relates to novel azo substituted aromatic compounds.

The novel compounds of this invention may be illustrated by the following general formula:

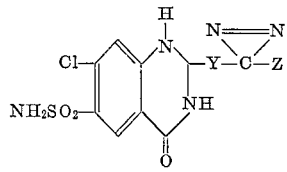

wherein Y is lower alkylene; and Z is lower alkyl.

The novel compounds of this invention generally are crystalline solids. The presence of the diazirine function is indicated by the characteristic absorption in the ultraviolet spectrum at 345–365 mμ.

The novel compounds of this invention are prepared by reacting, in the presence of a mineral acid, 2-amino-4-chloro-5-sulfamoylbenzamide (I).

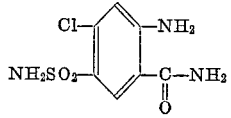

with an acetyl or aldehyde of the general formula:

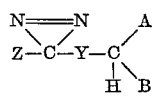

wherein Z is lower alkyl; Y is lower alkylene; and A and B are lower alkoxy or when taken together are oxygen or lower alkylenedioxy. The benzamide compound is generally available while the preparation of the diazirine compound is described hereinafter. The reaction preferably is carried out in a solvent, as for example, ethanol, at temperatures below 150° C. and preferably between 50 and 90° C.

The novel compounds of the present invention have diuretic activity in warm-blooded animals and as such are useful as therapeutic agents in the treatment of edema, etc.

The invention is more clearly described by the following example which illustrates the preparation of representative compounds. Parts are by weight unless otherwise indicated.

Example 1.—Preparation of 2-(3,3-azobutyl)-7-chloro-1,2,3,4-tetrahydro-4-oxo-6-quinazolinesulfonamide A solution of 15.4 parts of 1,1-diethoxypentan-4-one, 39.5 parts of methanol is added carefully to 150 parts of liquid ammonia and the solution is stirred at reflux temperature for 5½ hr. The solution is cooled in Dry Ice-acetone and 20 g. of hydroxylamine-O-sulfonic acid in 65 parts methanol is added over a period of about ½ hr. The colorless mixture is warmed to reflux and stirred for 2 hrs., then allowed to warm to room temperature overnight allowing for the evaporation of excess ammonia. The mixture is filtered, the precipitate is washed with several small portions of methanol, and the filtrate and washings are combined. The resulting solution is evaporated at reduced pressure until no further ammonia remains in the solution (about ⅓ original volume). This solution gives a strong positive test on acidic starch iodide paper. To the above solution is added 26 parts triethylamine, the solution is cooled in ice, stirred rapidly, and a solution of iodine in methanol is added until the red color of iodine persists for several seconds. The resulting solution is evaporated and the residue is distilled to yield the product, 4,4-azo-1,1-diethoxypentane, boiling point 42–43° C./2.5 mm.

A mixture of 0.47 parts of 4,4-azo-1,1-diethoxypentane, 0.62 parts of 2-amino-4-chloro-5-sulfamoylbenzamide, [Journal American Chemical Society, 81, 5508 (1959); 82, 2731 (1960)], 1 drop of concentrated hydrochloric acid and 40 parts of absolute ethanol are stirred and refluxed for about 1½ hr. Solution is complete after about 30 min. The solvent is then removed at reduced pressure and the residue recrystallized from acetone-water to give a white solid, melting point 156° C. (dec.).

We claim:
1. A compound of the formula:

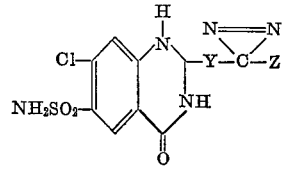

wherein Y is lower alkylene and Z is lower alkyl.
2. The compound according to claim 1; 2-(3,3-azobutyl) - 7 - chloro-1,2,3,4-tetrahydro-4-oxo-6-quinazolinesulfonamide.

References Cited
UNITED STATES PATENTS
2,976,289    3/1961    Cohen et al. _____ 260—256.5
3,073,826    1/1963    Scarborough _____ 260—256.5
3,201,398    8/1965    Arlt et al. _____ 260—256.5

NICHOLAS S. RIZZO, Primary Examiner
R. J. GALLAGHER, Assistant Examiner

U.S. Cl. X.R.
260—239, 397, 999